United States Patent [19]

Murahse et al.

[11] 3,887,765

[45] June 3, 1975

[54] OPTICAL LINE SCANNING SYSTEM

[75] Inventors: Katsuo Murahse; Kazuyuki Hara, both of Tokyo, Japan

[73] Assignee: Kabushiki Kaisha Ricoh, Tokyo, Japan

[22] Filed: Mar. 21, 1974

[21] Appl. No.: 453,382

[30] Foreign Application Priority Data

Apr. 22, 1973 Japan ............................... 48-45467

[52] U.S. Cl. ......... 178/7.6; 178/DIG. 27; 178/69.5; 178/7.1

[51] Int. Cl. ............................................ H04n 1/10

[58] Field of Search .............. 178/7.6, 7.1, DIG. 27, 178/69.5 F

[56] References Cited

UNITED STATES PATENTS

| | | | |
|---|---|---|---|
| 3,173,993 | 3/1965 | Smith | 178/69.5 F |
| 3,470,317 | 9/1969 | Kihara | 178/69.5 F |
| 3,646,568 | 2/1972 | Woywood | 178/7.6 |
| 3,665,100 | 5/1972 | Pinkham | 178/6.6 R |
| 3,835,249 | 9/1974 | Dattilo | 178/69.5 F |

*Primary Examiner*—Howard W. Britton
*Attorney, Agent, or Firm*—Frank J. Jordan

[57] ABSTRACT

An image of a line of an original document is projected onto an arc of a rotating scanner drum. A plurality of scanning elements fixed to the drum scan the line by sweeping the arc. A timing disc is fixed to the drum which contains one set of timing marks indicating the angular position of the drum relative to the position on the line being scanned. A separate sensing head is provided for each scanning element to sense the timing marks and produce timing output signals. Each sensing head is adjustable to compensate for manufacturing inaccuracy in the relative position of the associated scanning element relative to the timing marks.

19 Claims, 5 Drawing Figures

OPTICAL LINE SCANNING SYSTEM

The present invention relates to an optical line scanning system, and also to a novel timing system constituting a subcombination of the scanning system.

It has been known in the prior art to provide a line scanner for a graphic information transmission system such as a facsimile system having a rotating drum onto which an image of a line of the original graphic document is projected. The image on the drum is coincident with a circular arc on the surface of the drum, and a plurality of scanning elements are arranged on the surface of the drum to scan the line by sweeping the arc. The scanning speed is increased by providing several scanning elements rather than just one, and each time a line is scanned by one scanning element, the document is moved and a successive line is scanned by the next scanning element.

A timing disc is fixed to the drum which has several sets of timing marks thereon, each set corresponding to a respective scanning element and indicating the angular position of the drum relative to the position on the line being scanned. A sensing head is arranged adjacent to the drum to sense the timing marks and produce timing signals in response thereto. However, the manufacturing accuracy in positioning the timing marks and the scanning elements relative to each other must be quite high, or else there will be a lack of synchronization between adjacent lines or "bit deviation." Production of these units is therefore quite expensive.

A prior art device has been proposed in which the line scanned and the arc on the surface of the drum onto which the image of the line is projected are coplaner. The present invention is not limited in this respect, and the line of the original document may be located anywhere in relation to its image on the drum through the use of a suitable optical system. However, the main feature of the invention is the introduction of a novel timing system allowing adjustment of the relationship between a single set of timing marks and a plurality of sensing heads, one for each scanning element, by which satisfactory synchronization of scanned data and timing signals is accomplished without the need for close manufacturing tolerance between the scanning elements and the timing marks.

It is therefore an important object of the present invention to provide an optical line scanning system for a graphic data transmission system such as a facsimile system in which novel adjustment means are included which eliminate the need for high manufacturing precision in the position of scanning elements relative to timing marks and therefore produce a major reduction in manufacturing cost.

It is another important object of the present invention to provide a novel timing system comprising adjustment means as described above which constitutes a subcombination of the optical line scanning system and is further applicable as a substantial improvement to known optical line scanning systems.

The above and other objects, features and advantages of the present invention will become more apparent from the following detailed description taken in conjunction with the accompanying drawings in which like reference numerals designate like elements throughout the drawings, directions such as "vertical," "leftward," etc. are those as viewed in the respective drawings, and in which.

Figures 1, 2, 3:
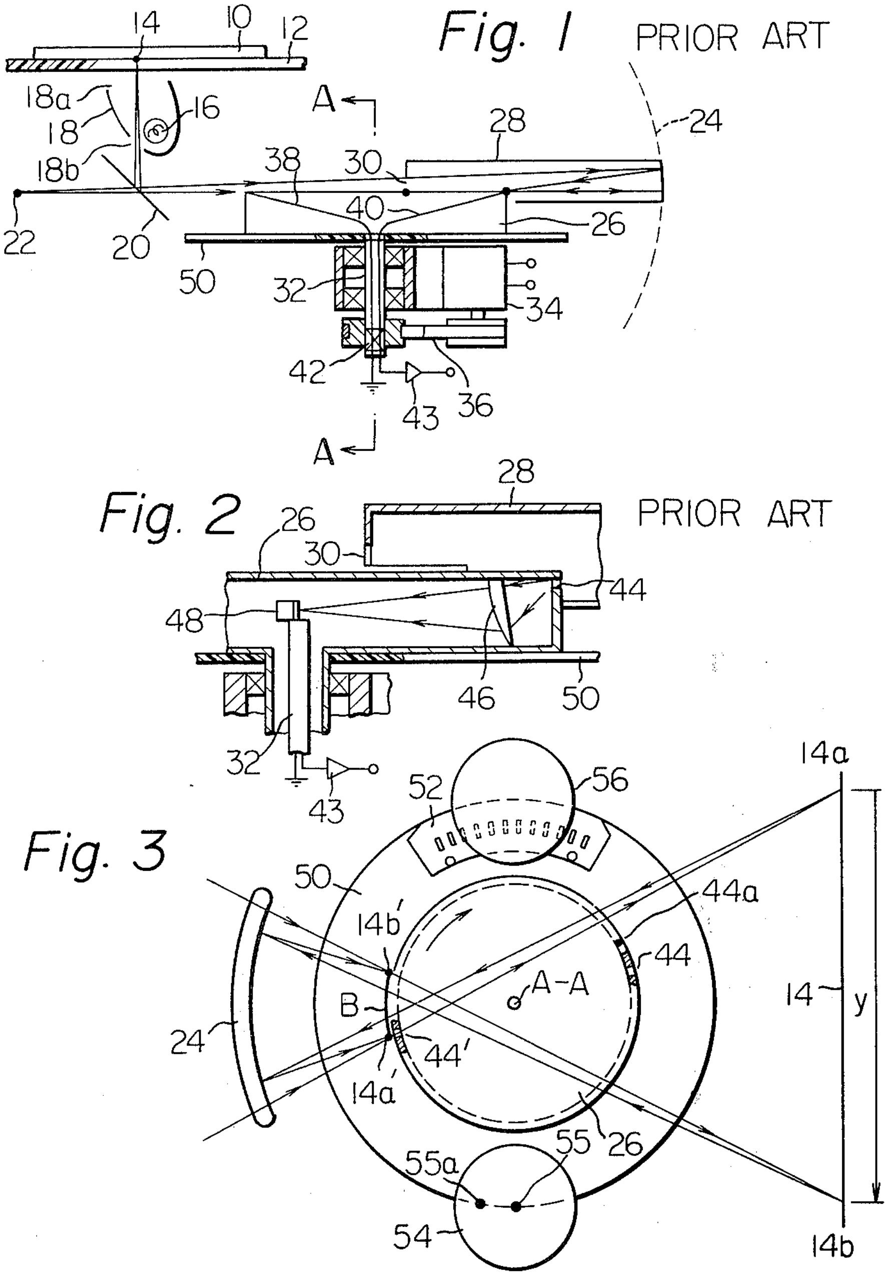
Fig. 1 PRIOR ART, Fig. 2 PRIOR ART, Fig. 3
FIG. 1 is a diagrammatic side sectional view of a prior art optical line scanning system to which the present invention is directed.
FIG. 2 is a fragmentary diagrammatic side sectional view of important elements of the system shown in FIG. 1 in a modified form.
FIG. 3 is a schematic top view, partly in section, of an optical line scanning system according to the present invention.

Referring now to FIG. 1, a graphic document 10 is placed on a transparent sheet 12, and a line 14 on the document 10 is in a scanning position. The line 14 is oriented perpendicular to the plane of the paper. A light source 16 is arranged in an elliptical, cylindrical reflector 18 which focusses a beam of light onto the line 14. The light source 16 and the reflector 18 are elongated and also extend perpendicular to the plane of the paper, and have a length approximately equal to that of the line 14. The reflector 18 has cutouts **18*a* and 18*b* which are arranged so that an image of the line 14 is incident upon the surface of a plane mirror 20 which is oriented at a 45° angle to vertical axis A—A of the scanning system. The surface of the document 10 is perpendicular to the axis A—A. It is also possible to arrange the document 10 parallel to the axis A—A by rotating it 90° counterclockwise so that the line 14 appears at point 22 which is the location of the virtual image of the line 14 in the arrangement shown in FIG. 1. In this case, the line 14 would be coplaner with its image as projected onto the drum, as will be appreciated from further description. As mentioned above, the line 14** may be located anywhere relative to its projected image within the scope of the invention.

From the mirror 20, the image of the line 14 is reflected onto a spherical mirror 24, and then back onto the top corner of a rotary scanner body or scanner drum 26 as shown by arrows. A substantially light tight enclosure 28 is provided with a semicircular aperture 30 so that the image can pass therethrough. The drum 26 is rotatable about the axis A—A by means of a shaft 32 onto which it is fixed, a drive motor 34 and a belt and pulley assembly 36.

The image of the line 14 is focussed onto the drum 26 as a circular arc substantially coincident with the top surface thereof. Scanning elements in the form of optical fibers 38 and 40 are arranged to sweep the arc to thereby scan the line 14.

The optical fiber 40 is shown as in a position to scan the image of the line 14. After this is accomplished, supplementary means which are not shown will index the document 10 so that a new line will be brought to the position in which the line 14 is shown. This new line will then be scanned by the fiber 38. This operation is repeated until the entire document 10 is scanned whereby successive lines are alternatively scanned by the fibers 38 and 40. Although the optical fibers or scanning elements are shown as being two in number, any number can be provided which will operate in conjunction with the supplementary means. The scanning elements are equiangularly spaced about the circumference of the drum 26, and lead to a photosensitive unit 42 and an amplifier 43 which convert optical density variations of the lines into electrical signals for transmission by means which are not shown.

FIG. 2 and FIG. 3 show portions of the system of FIG. 1, and also an alternative form of the scanning elements. Here, two scanning elements (no numerals) comprise pinholes 44 and 44' respectively. For simplicity of illustration, only the scanning element comprising the pinhole 44 is shown in FIG. 2, and further comprises a plano-convex lens 46, a photosensitive unit 48 and the amplifier 43. The image of the line 14 from the mirror 24 is focussed onto the photosensitive unit 48 by means of the pinhole 44 and the lens 46, and is processed as in the device of FIG. 1.

Also shown in the drawings is a timing member such as a timing disc 50 fixed for rotation with the drum 26. If desired, the disc 50 may be integrally formed with the drum 26.

FIG. 3 shows the timing disc 50 as part of a timing system constituting part of the line scanning system embodying the present invention. The drum 26 rotates clockwise as shown by an arrow, and one set of timing marks 52 is provided as variations in optical density on the timing disc 50. If desired, the timing marks 52 may be transparent areas on the disc 50. Sensing heads 54 and 56 are provided to sense the timing marks 52, and produce an electrical signal each time a timing mark 52 is sensed for use in reconstructing the document 10 at the receiving end (not shown). The sensing heads 54 and 56 are associated with the pinholes 44 and 44' respectively, and the pinhole 44' is shown in a scanning position to sweep the arc B onto which the image of the line 14 is projected. In the prior art, a separate set of timing marks is utilized for each scanning element in conjunction with only one sensing head, with a subsequent need for high tolerance in the relative positioning of the scanning elements and the timing marks leading to high production cost. In the present invention, however, only one set of timing marks 52 is utilized in conjunction with a plurality of sensing heads 54 and 56, and the general principle of the present invention is that a separate sensing head will be provided for each scanning element. The main feature of the invention is that the sensing heads 54 and 56 are adjustable relative to the circumference of the timing disc 50, so that manufacturing inaccuracy in the relative positioning of the pinholes 44 and 44' and the timing marks 52 can be individually compensated for by moving the respective sensing head 54 and 56 and then fixing it in the adjusted position. The sensing heads 54 and 56 are thus approximately equiangularly spaced about the circumference of the disc 50.

For example, assume that due to inaccuracy in manufacture, the pinhole 44 was attached to the drum 26 at a point 44*a*. In this case, the timing marks 52 would then begin to be sensed by the sensing head 54 before the pinhole 44 started scanning the arc B, and a phase error would result causing improper synchronization at the receiving end. This defect can be easily corrected in the timing system of the present invention shown in FIG. 3 by moving the sensing head 54 from its normal position 55 to a position 55*a*, whereby the arc 55–55*a* is equal in magnitude and spaced in an opposite angular direction to the arc 44–44*a*. By this adjustment, the timing marks 52 will arrive at the sensing head 54 later than they would if the sensing head 54 were at the position 55, and proper synchronization will be restored.

The relationship between the position on the line 14 being scanned by the pinhole 44' and the angular displacement of the drum 26 is also shown in FIG. 3. Points 14*a* and 14*b* at the leading and trailing ends of the line 14 correspond to points 14*a'* and 14*b'* on the arc B on which the image of the line 14 is projected. The timing marks 52 are non-lineally arranged by a method known in the art to correspond to the position in the main scanning direction Y on the line 14 being scanned by the pinhole 44 or 44'.

Figure 4:
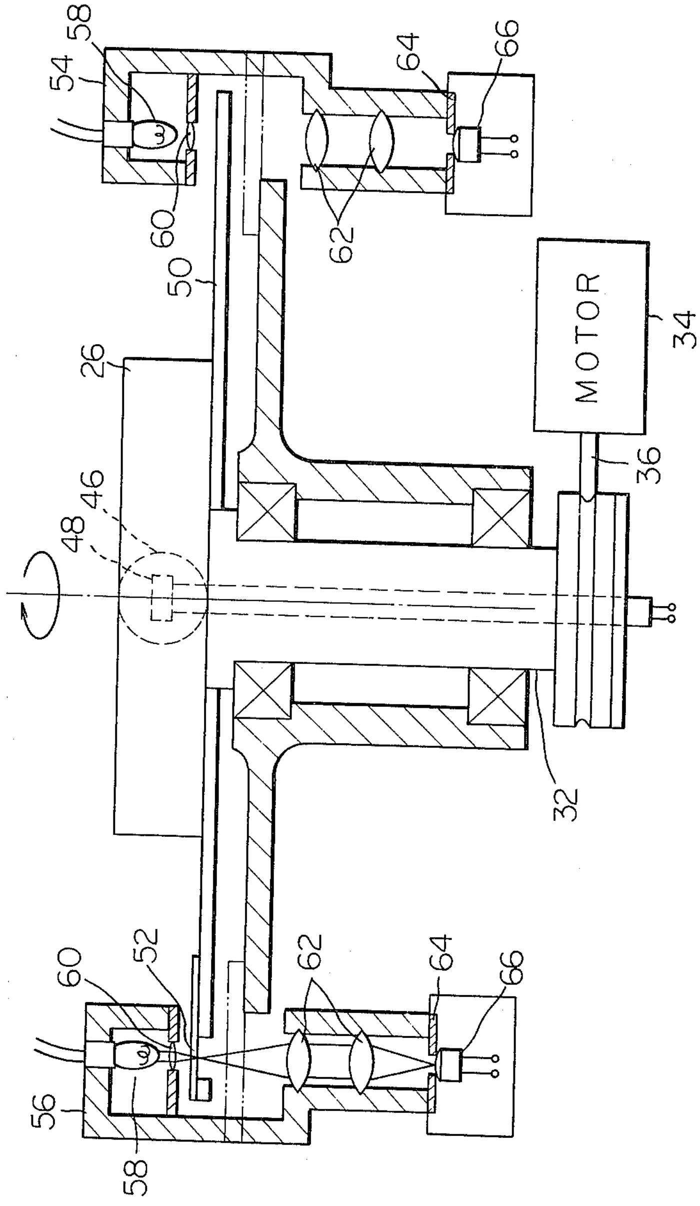
FIG. 4 is a side sectional view of a timing system constituting part of the scanning system shown in FIG. 3.

Referring now to FIG. 4, an exemplary form of the timing system is shown in cross-section. Projectors (no numerals) of the sensing heads 54 and 56 comprise light sources 58 and first converging optical elements such as plano-convex lenses 60 to focus beams of light onto the timing marks 52. The width of the light beams is narrow enough that they will pass through only one timing mark at a time. The light beams are then focussed onto photosensitive units 66 constituting a receiver (no numeral) by means of second converging optical elements such as double convex lenses 62 and masks 64. The masks 64 limit the width of the light beams to ensure that the light beams will pass through only one timing mark at a time. The sensing head 56 is shown as sensing the timing marks 52 to provide synchronization for graphic data produced by the pinhole 44' scanning element. Each time a light beam from a source 58 impinges upon a photosensitive unit 66, the unit 66 will produce an electrical signal for transmission to the receiving end.

Figure 5:
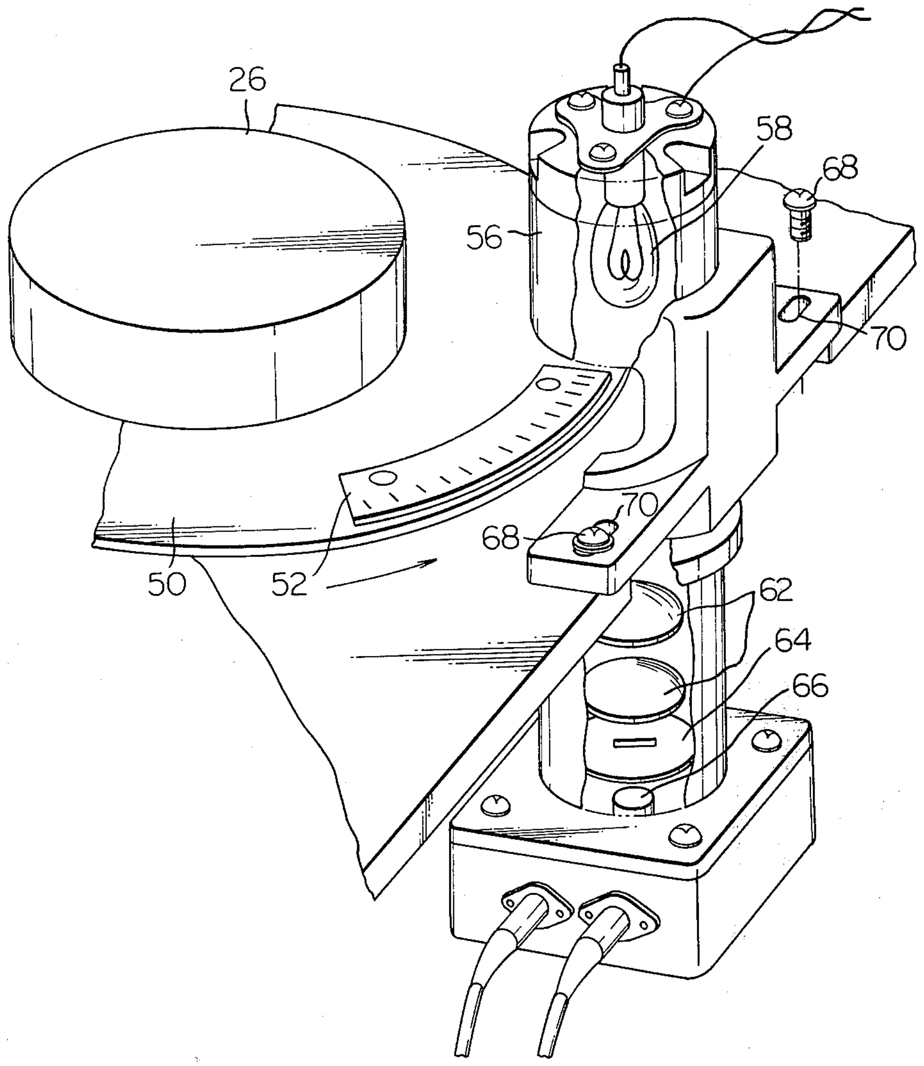
FIG. 5 is a perspective view, partly in section, of a part of the timing system shown in FIG. 4.

If desired, the lenses 60 may be omitted as shown in FIG. 5. The sensing head 56 (and the sensing head 54 although not shown in FIG. 5) are movable about the circumference of the timing disc 50 by means such as bolts 68 and annular slots 70 as shown to compensate for inaccuracy in positioning the timing marks 52 relative to the pinholes 44 and 44'.

From the above detailed description and attached drawings, the novelty and usefulness of the invention will be readily apparent.

Certain specific embodiments of the present invention have been shown and described for the purpose of illustration but it will be apparent that various modifications and other embodiments are possible within the scope of the present invention. It is to be understood therefore that the present invention is not limited to the specific arrangement shown but in its broadest aspects it includes all equivalent embodiments and modifications which come within the scope of the present invention.

What is claimed is:

1. In an optical line scanning system having a rotary scanner body carrying a plurality of scanning elements thereon which are equiangularly spaced about the axis of the scanner body, and an optical system to focus an image of the line on the rotary scanner body so that the image of the line will be swept by the scanning elements upon rotation of the scanner body, the improvement comprising:

a timing member rotatable with the scanner body and having one set of timing marks thereon indicating the angular position of the scanner body relative to the position of the line being scanned by the scanning elements; and a plurality of sensing heads arranged adjacent to said timing member to sense said timing marks and produce electrical signals in response thereto;

the sensing heads being substantially equiangularly spaced about the circumference of the timing member and the number of said sensing heads being equal to the number of said scanning elements, each of said sensing heads being associated with a respective scanning element.

2. The improvement according to claim 1, in which said timing member is fixed to the scanner body for rotation therewith.

3. The improvement according to claim 1, in which said timing member is integral with the rotary scanner body.

4. The improvement according to claim 1, in which said sensing heads are adjustable relative to the circumference of said timing member to compensate for manufacturing inaccuracy in the relative position of the scanning element relative to said timing marks.

5. The improvement according to claim 4, in which:

said timing marks are provided as variations in optical density on said timing member; and in which each adjustable sensing head comprises a projector arranged to focus a beam of light onto said timing marks, a width of the light beam being narrow enough to impinge upon only one timing mark, and a receiver comprising a photosensitive element arranged to have the beam of light incident thereupon and generate said electrical signals in response to sensed timing marks.

6. The improvement according claim 5, in which the optical density of said timing marks is less than that of the remainder of said timing member.

7. The improvement according to claim 5, in which said projector comprises a first converging optical element to focus the light beam on said timing marks, and said receiver further comprises a second converging optical element arranged between said timing member and said photosensitive element to focus the light beam on said photosensitive element.

8. The improvement according to claim 7, in which said receiver further comprises a mask arranged between said second converging optical element and said photosensitive element to limit the width of the light beam to be focussed onto the photosensitive element.

9. The improvement according to claim 7, in which said first and second converging optical elements are lenses, each having at least one convex surface.

10. An optical line scanning system comprising:

a rotary scanner body carrying a plurality of scanning elements thereon which are equiangularly spaced about the axis of the scanner body;

an optical system to focus an image of the line on the rotary scanner body so that the image of the line will be swept by the scanning elements upon rotation of the scanner body;

a timing member rotatable with the scanner body and having one set of timing marks thereon indicating the angular position of the scanner body relative to the position on the line being scanned by the scanning elements; and a plurality of sensing heads arranged adjacent to said timing member to sense said timing marks and produce electrical signals in response thereto;

the sensing heads being substantially equiangularly spaced about the circumference of the timing member and the number of said sensing heads being equal to the number of said scanning elements, each of said sensing heads being associated with a respective scanning element.

11. An optical line scanning system according to claim 10, in which said timing member is fixed to the scanner body for rotation therewith.

12. An optical line scanning system according to claim 10, in which the scanner body is a drum, and the image of the line, when focussed on the drum by the optical system, defines substantially an arc of a circle.

13. An optical line scanning system according to claim 12, in which the timing member is integral with the drum.

14. An optical line scanning system according to claim 10, in which the timing marks are provided as variations in optical density on the timing member.

15. An optical line scanning system according to claim 14, in which the optical density of the timing marks is less than that of the remainder of the timing member.

16. An optical line scanning system according to claim 10, in which said sensing heads are adjustable relative to the circumference of said timing member to compensate for manufacturing inaccuracy in the relative position of the scanning element relative to said timing marks.

17. An optical line scanning system according to claim 16, in which each of said adjustable sensing heads comprises:

a projector arranged to focus a beam of light onto the timing marks, the width of the light beam being narrow enough to impinge upon only one timing mark; and a receiver comprising a photosensitive element arranged to have the beam of light incident thereupon and generate the electrical signals in response to sensed timing marks.

18. An optical line scanning system according to claim 17, in which the projector comprises a first converging optical element to focus the light beam onto the timing marks, and the receiver comprises a second converging optical element arranged between the timing member and the photosensitive element to focus the light beam on the photosensitive element, and a mask arranged between the second converging optical element and the photosensitive element to limit the width of the light beam to be focussed onto the photosensitive element.

19. An optical line scanning system according to claim 18, in which the first and second converging optical elements are lenses, each having at least one convex surface.

* * * * *

UNITED STATES PATENT OFFICE
CERTIFICATE OF CORRECTION

PATENT NO. : 3,887,765
DATED : June 3, 1975
INVENTOR(S) : Katsuo MURASE and Kazuyuki HARA It is certified that error appears in the above-identified patent and that said Letters Patent are hereby corrected as shown below:

Correct the first inventor's last name to read --Murase-- instead of "Murahse".

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*